(12) United States Patent
Wake et al.

(10) Patent No.: US 8,129,044 B2
(45) Date of Patent: Mar. 6, 2012

(54) FUEL CELL SYSTEM AND METHOD FOR OPERATING THE SAME

(75) Inventors: Chihiro Wake, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 887 days.

(21) Appl. No.: 12/184,360

(22) Filed: Aug. 1, 2008

(65) Prior Publication Data
US 2009/0035614 A1 Feb. 5, 2009

(30) Foreign Application Priority Data
Aug. 3, 2007 (JP) ................................. 2007-202853

(51) Int. Cl.
*H01M 8/00* (2006.01)
(52) U.S. Cl. .......... 429/19; 429/427; 429/428; 429/429; 429/443; 429/444
(58) Field of Classification Search .................. 429/427, 429/428, 429.443, 444, 19
See application file for complete search history.

(56) References Cited

U.S. PATENT DOCUMENTS

| | | | |
|---|---|---|---|
| 7,846,598 B2 * | 12/2010 | Wake et al. | 429/429 |
| 7,858,251 B2 * | 12/2010 | Wake et al. | 429/429 |
| 2007/0059569 A1 | 3/2007 | Matsumoto et al. | |
| 2007/0122663 A1 * | 5/2007 | Wake et al. | 429/13 |

FOREIGN PATENT DOCUMENTS

| | | |
|---|---|---|
| JP | 2003-331893 | 11/2003 |
| JP | 2006-185904 | 7/2006 |

OTHER PUBLICATIONS

European Office Action for Application No. 08013785.4, dated Nov. 13, 2008.

* cited by examiner

*Primary Examiner* — Kimberly Nguyen
*Assistant Examiner* — Caleb Henry
(74) *Attorney, Agent, or Firm* — Nelson Mullins Riley & Scarborough LLP; Anthony A. Laurentano

(57) ABSTRACT

A fuel cell system including: a fuel cell including a fuel gas channel and an oxidant gas channel, which is configured to generate electricity using a fuel gas and an oxidant gas; a diluting unit configured to dilute gas discharged from the fuel gas channel by mixing the discharged gas with a dilution gas which is supplied from an oxidant gas supply unit and passed through and discharged from the fuel cell, and to exhaust the diluted gas to outside; a purge valve configured to purge gas in the fuel gas channel to the diluting unit; a scavenging unit configured to scavenge the fuel gas channel and the oxidant gas channel; and a dilution assist unit configured to supply a dilution assist gas to the diluting unit through an assist passage connected to the diluting unit to assist dilution in the diluting unit, during scavenging by the scavenging unit.

4 Claims, 9 Drawing Sheets

FUEL CELL SYSTEM AND METHOD FOR OPERATING THE SAME

CROSS-REFERENCE TO RELATED APPLICATIONS

This application claims the foreign priority benefit under Title 35, United States Code, section 119 (a)-(d), of Japanese Patent Application No. 2007-202853, filed on Aug. 3, 2007 in the Japan Patent Office, the disclosure of which is herein incorporated by reference in its entirety.

BACKGROUND OF THE INVENTION

1. Field of the Invention

The present invention relates to a fuel cell system in which scavenging is performed during, for example, a halt of electricity generation by a fuel cell, and a method for operating the same.

2. Description of the Related Art

Recently, studies have been widely made to develop a fuel cell, such as polymer electrolyte fuel cell (PEFC), in which electricity is generated using hydrogen (fuel gas) supplied to an anode and oxygen-containing air (oxidant gas) supplied to a cathode. Such a fuel cell is formed by stacking a plurality of single cells, each formed by sandwiching a solid polymer electrolyte membrane between an anode and a cathode. When electricity is generated in the fuel cell, water is also generated at the cathode by an electrochemical reaction with hydrogen and oxygen.

When a fuel cell mounted on a vehicle or the like is used in a low-temperature environment (e.g., below zero), residual water (produced water) may be frozen and may damage a solid polymer electrolyte membrane and the like. Therefore, a process is required in which a scavenging gas is supplied to a cathode side to expel residual water (cathode scavenging), during a halt of electricity generation by the fuel cell. In addition, since water generated on the cathode side will penetrate through the solid polymer electrolyte membrane from the cathode to the anode, a process is required for the anode side to expel residual water (anode scavenging).

Accordingly, for example, JP2003-331893A (paragraphs 0022-0024 and FIGS. 1 and 3) discloses a technical idea in which, when a fuel cell system is used in a low-temperature environment, in order to prevent the produced water from being frozen in the fuel cell stack during a halt of electricity generation, cathode scavenging and anode scavenging are performed at the same time by switching valve positions of a pair of valves each communicating with either an anode inlet or a cathode inlet, to supply an unhumidified cathode gas (air) to both of the cathode and the anode in the fuel cell during the halt of electricity generation.

Meanwhile, when the fuel cell system disclosed in JP2003-331893A is used and, for example, cathode scavenging is performed first and anode scavenging is subsequently performed, most of a cathode gas (air) is supplied to the anode. Therefore, when the purge valve is opened and hydrogen purging is performed, there arises a problem that an amount of the cathode gas (air flow rate) to be introduced to the diluter provided downstream of the purge valve through the cathode is reduced, and that a concentration of hydrogen exhausted from the diluter is increased.

Accordingly, it would be desirable to provide a fuel cell system and an operation method therefor, in which high-concentration hydrogen is prevented from being exhausted to outside, even when hydrogen purging is performed during scavenging.

It would be also desirable to provide a fuel cell system and an operation method therefor, in which hydrogen purging during scavenging is smoothly performed to thereby shorten a time period for scavenging.

SUMMARY OF THE INVENTION

In one aspect of the present invention, there is provided a fuel cell including a fuel gas channel on an anode side and an oxidant gas channel on a cathode side which is configured to generate electricity using a fuel gas supplied to the fuel gas channel and an oxidant gas supplied to the oxidant gas channel; a diluting unit configured to dilute gas discharged from the fuel gas channel by mixing the discharged gas with a dilution gas which is supplied from an oxidant gas supply unit and passed through and discharged from the fuel cell, and to exhaust the diluted gas to outside; a purge valve configured to purge gas in the fuel gas channel to the diluting unit; a scavenging unit configured to scavenge the fuel gas channel and the oxidant gas channel; and a dilution assist unit configured to supply a dilution assist gas to the diluting unit through an assist passage connected to the diluting unit to assist dilution in the diluting unit, during scavenging by the scavenging unit. With this configuration, for example, even when the purge valve is activated and gas in the fuel gas channel is purged during a halt of electricity generation, a fuel gas (hydrogen) of high concentration is prevented from being exhausted from the diluting unit, since the dilution is assisted by a dilution assist gas supplied from the dilution assist unit.

According to the present aspect, even when the gas in the fuel gas channel is discharged during scavenging, by activating the dilution assist unit to supply a dilution assist gas, an amount of gas for dilution in the diluting unit can be steadily ensured. In addition, though water produced from electricity generation remains in the diluting unit, the flow rate of the gas supplied to the diluting unit increases, and therefore, the produced water stored in the diluting unit can be steadily exhausted to outside, enhancing water-discharge efficiency. Accordingly, even when the fuel cell system of the present invention is used, for example, in a low-temperature environment (e.g., below zero), the produced water in the fuel cell, the diluting unit and the like are prevented from being frozen, ensuring immediate startup in a low-temperature environment.

In the present invention, it is preferable that the fuel cell system further includes a concentration detector configured to detect a concentration of hydrogen contained in gas exhausted from the diluting unit, and when a concentration of hydrogen exhausted from the diluting unit detected by the concentration detector is less than a second specific concentration which is below an upper limit value (upper limit concentration), the supply of the dilution assist gas from the dilution assist unit to the diluting unit is stopped. According to the present aspect, when the concentration of hydrogen exhausted from the diluting unit is less than the second specific concentration, the supply of the dilution assist gas is stopped. Therefore, by performing the dilution assist only when it is necessary, it becomes possible to reduce power consumption, for example, during the dilution assist, and at the same time, to reduce noise during the assist.

Further in the present invention, it is preferable that the assist passage is formed of a passage that bypasses the fuel cell and is configured to supply a portion of the oxidant gas supplied from the oxidant gas supply unit to the diluting unit. With this configuration, according to the present aspect, an unhumidified gas which does not pass the fuel cell is used as a dilution assist gas supplied from the dilution assist unit, and as compared with a humidified gas which passed the fuel cell, a pressure loss due to passing the fuel cell can be reduced, to thereby reduce a load on the oxidant gas supply unit.

Moreover in the present invention, it is preferable that cathode scavenging is performed first and anode scavenging is performed subsequently by the scavenging unit, and during the cathode scavenging, gas in the fuel gas channel is purged by the purge valve and a dilution assist is performed by the dilution assist unit. For example, if hydrogen purging is performed by purge valve for the first time during anode scavenging, there may be a risk that the concentration of hydrogen exhausted from the diluting unit exceeds the upper limit concentration. However, even in this case, according to the present aspect, gas purging is performed during cathode scavenging which precedes anode scavenging, and at the same time, the dilution assist unit is activated to assist the dilution. As a result, the hydrogen concentration in the fuel gas channel can be reduced in advance, and during the anode scavenging which follows the cathode scavenging, the concentration of hydrogen exhausted from the diluting unit can be reduced to less than the second specific concentration. In this case, by performing a dilution assist, a time period for dilution by gas purging can be shortened, which in turn shortens a time period for cathode scavenging.

Further in the present invention, it is preferable that, when anode scavenging is performed by the scavenging unit, gas in the fuel gas channel is purged by the purge valve and a dilution assist is performed by the dilution assist unit. For example, if gas purging is performed during anode scavenging, there may be a risk that the concentration of hydrogen exhausted from the diluting unit exceeds the upper limit concentration. However, even in this case, according to the present aspect, a dilution assist is performed simultaneously with the purging during anode scavenging. As a result, a peak concentration generated by a sudden rise of the hydrogen flow rate at the initiation of the anode scavenging can be suppressed, and the concentration of hydrogen exhausted from the diluting unit can be reduced to less than the specific concentration.

Further in the present invention, it is preferable that a scavenging gas for the anode scavenging is composed of an oxidant gas supplied from the oxidant gas supply unit. With this configuration, during anode scavenging, when air supplied from the oxidant gas supply unit, such as compressor, is used, the air may be utilized as a dilution assist gas in the dilution assist unit.

Further in the prevent invention, it is preferable that the dilution assist unit is configured to reduce a concentration of the fuel gas in the diluting unit, by adding a dilution assist gas to the diluting unit to increase an amount of gas for dilution in the diluting unit. In addition, it is preferable that the dilution assist unit is configured to push gas, having a low fuel gas concentration by having been purged into the diluting unit out of the diluting unit, by the dilution assist gas supplied to the diluting unit.

In another aspect of the present invention, there is provided a method in which cathode scavenging is performed first and anode scavenging is performed subsequently, during which cathode scavenging, it is determined whether or not a concentration of hydrogen exhausted from a diluting unit is less than a first specific concentration which is an upper limit value, when it is determined that the hydrogen concentration is less than the first specific concentration, a purge valve is maintained in an opened state to perform purging, and subsequently, it is determined whether or not a concentration of hydrogen exhausted from the diluting unit is a second specific concentration or more which requires a dilution assist, and when it is determined that the hydrogen concentration is the second specific concentration or more, a dilution assist gas is supplied to the diluting unit to assist dilution. It is further preferable that after completion of the cathode scavenging, anode scavenging is performed subsequently.

Accordingly, in the present invention, during cathode scavenging which precedes anode scavenging, by performing a dilution assist in which a dilution assist gas is supplied to the diluting unit, a time period for cathode scavenging can be shortened.

In another aspect of the present invention, there is provided a method in which cathode scavenging is performed first and anode scavenging is performed subsequently, during which cathode scavenging, it is determined whether or not a concentration of hydrogen exhausted from a diluting unit is less than a first specific concentration which is an upper limit value, when it is determined that the hydrogen concentration is less than the first specific concentration, a purge valve is maintained in an opened state to perform purging, and subsequently, it is determined whether or not a concentration of hydrogen exhausted from the diluting unit is less than a third specific concentration which is low and requires a dilution assist for pushing out gas, and when it is determined that the hydrogen concentration is less than the third specific concentration, the dilution assist is performed by supplying a dilution assist gas to the diluting unit for blowing hydrogen in the diluting unit and pushing the gas out of the diluting unit. Accordingly, by pushing low-concentration hydrogen gas out of the diluting unit by the dilution assist gas, hydrogen purging during scavenging is smoothly performed to thereby shorten a time period for scavenging.

In another aspect of the present invention, there is provided a method in which cathode scavenging is performed first and anode scavenging is performed subsequently, during which anode scavenging, it is determined whether or not a concentration of hydrogen exhausted from a diluting unit is less than a first specific concentration which is an upper limit value, when it is determined that the hydrogen concentration is less than the first specific concentration, a purge valve is maintained in an opened state to perform purging, and subsequently, it is determined whether or not a concentration of hydrogen exhausted from the diluting unit is a second specific concentration or more which requires a dilution assist, and when it is determined that the hydrogen concentration is the second specific concentration or more, a dilution assist gas is supplied to the diluting unit to assist dilution.

Accordingly, in the present invention, during anode scavenging, a dilution assist gas is supplied to the diluting unit to assist dilution. As a result, a peak concentration generated at the initiation of the anode scavenging can be suppressed, and the concentration of hydrogen can be reduced.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF PREFERRED EMBODIMENTS

Embodiments of the present invention will be described in detail below with reference to the accompanying drawings.

In the present embodiment, descriptions will be made while illustrating an automobile, to which a fuel cell system is applied. However, the application of the fuel system is not limited to the automobile, and it may be applied to other types of vehicle systems, such as airplane and ship, or to a stationary system as a household power source.

In the present specification, the term "dilution assist" implies effects obtained by supplying a dilution assist gas into a diluter, i.e., not only an effect of assisting hydrogen dilution, but also an effect of pushing out gas in the diluter.

Figure 1:
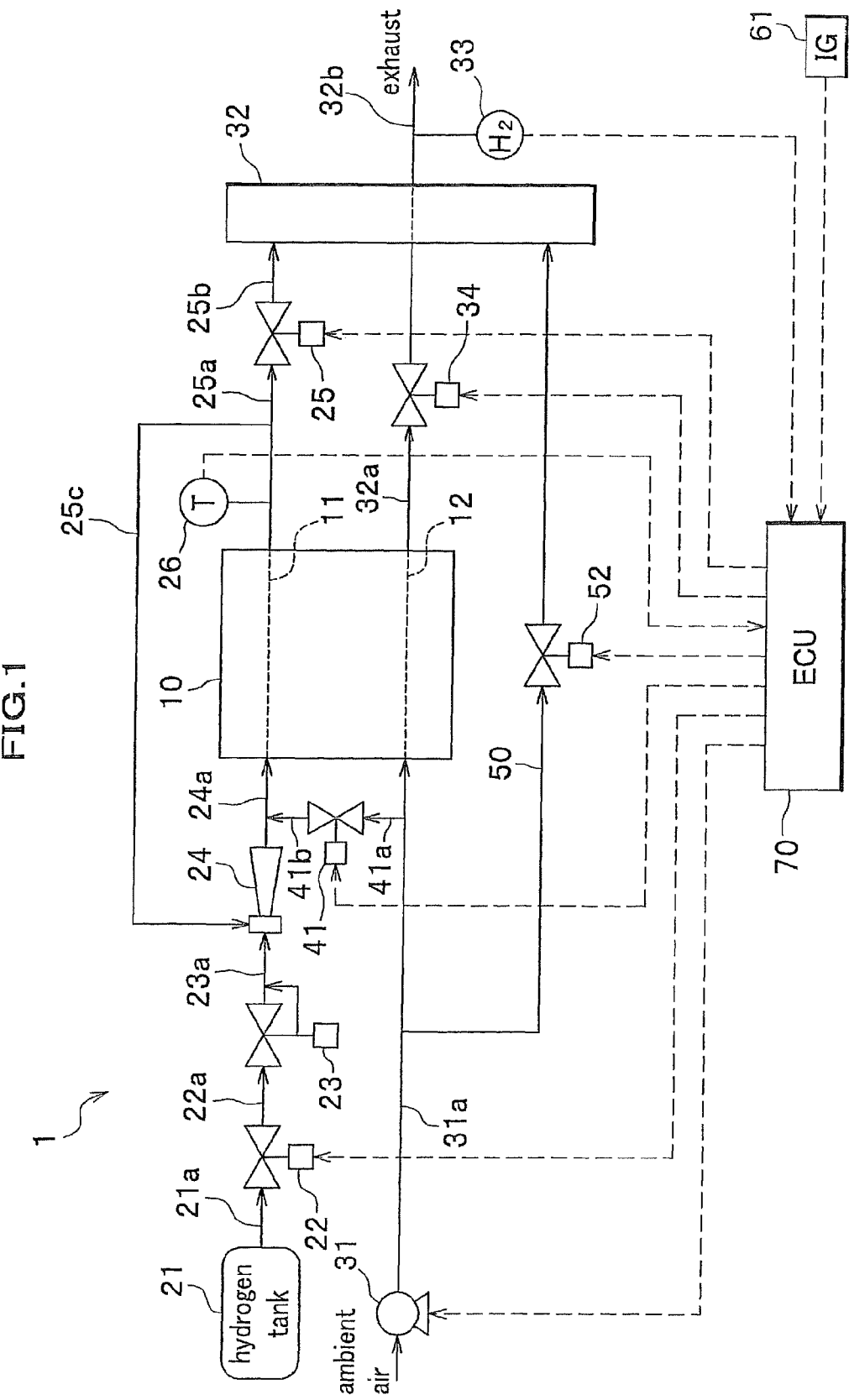
FIG. 1 is a schematic diagram showing a fuel cell system according to an embodiment of the present invention.

A fuel cell system 1 according to a present embodiment shown in FIG. 1 is mounted on a fuel cell vehicle (moving body, not shown). The fuel cell system 1 includes: a fuel cell stack 10; an anode system (fuel gas supply unit) for supplying hydrogen (fuel gas) to an anode of the fuel cell stack 10 and exhausting hydrogen therefrom; and a cathode system for supplying oxygen-containing air (oxidant gas) to a cathode of the fuel cell stack 10 and exhausting air therefrom.

Further, the fuel cell system 1 includes: a scavenging system configured to lead a scavenging gas (unhumidified air) from the cathode system to the anode system during scavenging of the fuel cell stack 10; a dilution assist system configured to assist dilution of hydrogen purged by a purge valve 25, which will be described later, during scavenging by the scavenging system; an IG (ignition) 61; and ECU (electronic control unit) 70 configured to electronically control these components.

Herein, the scavenging of the fuel cell stack 10 means to expel moisture (water) or the like in the fuel cell stack 10 to outside by a scavenging gas. In the present embodiment, as a scavenging gas, unhumidified air from a compressor 31 is used. However, the scavenging gas is not limited to this, and for example, nitrogen from a nitrogen tank (not shown) may be used.

In the present embodiment, scavenging of the fuel cell stack 10 is performed in the case where the fuel cell system 1 suffers a low-temperature environment during a system shutdown (i.e., when electricity generation is halted), and where an inside of the system including the fuel cell stack 10 would be frozen. When the fuel cell stack 10 is scavenged, a gas in both of an anode channel (fuel gas channel) 11 and a cathode channel (oxidant gas channel) 12, which will be described later, formed on the sides of an MEA (membrane electrode assembly), is replaced by the scavenging gas, i.e., unhumidified air. Then, the system is shut down (i.e., electricity generation is halted) with the channels filled with the unhumidified air.

Therefore, during the halt of the system, no potential difference (or OCV; Open Circuit Voltage) is generated in the MEA, and the MEA is not exposed to the electric field, to thereby prevent the deterioration of the MEA (such as electrolysis of the electrolyte membrane).

Hereinbelow, the fuel cell system 1 will be described in detail.

The fuel cell stack 10 is formed of a plurality (e.g., 200-400) of solid polymer type single cells laminated over one another and connected in series. A single cell has one MEA and two conductive separators sandwiching the MEA therebetween. The MEA has an electrolyte membrane (solid polymer membrane) formed of a monovalent cation exchange membrane or the like and an anode and a cathode sandwiching the electrolyte membrane therebetween.

The anode and the cathode are mainly formed of a conductive porous body, such as carbon paper, and contain catalysts (such as Pt and Ru) for allowing an electrode reaction to occur in the anode and the cathode.

In each separator, grooves for supplying hydrogen or air and through holes for supplying or exhausting hydrogen or air, to or from all single cells, are formed in entire surface of each MEA, and these grooves and through holes function as the anode channel 11 (fuel gas channel) and the cathode channel 12 (oxidant gas channel). Therefore, volumes of the anode channel 11 and the cathode channel 12 in the fuel cell stack 10 depend on the shape and length of the groove and the number of single cells laminated, and thus the volume is a fixed value determined based on the specification of the fuel cell stack 10.

When hydrogen is supplied to each anode through the anode channel 11, and air is supplied to each cathode through the cathode channel 12, an electrode reaction occurs and a potential difference (OCV) is generated in each single cell. In this OCV-generated situation, when there is a request for electricity generation and a contactor (not shown) is turned on, the fuel cell stack 10 generates electricity.

The anode system includes a hydrogen tank 21, a cutoff valve 22, a pressure reducing valve 23, an ejector 24, the purge valve 25 and a temperature sensor 26. The hydrogen tank 21 is connected to an inlet of the anode channel 11, through piping 21a, the cutoff valve 22, piping 22a, the pressure reducing valve 23, piping 23a, the ejector 24, and piping 24a. When the cutoff valve 22 is opened in accordance with an energizing signal from the ECU 70, hydrogen is supplied to the anode channel 11 from the hydrogen tank 21 through the cutoff valve 22 and the like. Therefore in the present embodiment, a fuel gas supply unit includes the hydrogen tank 21, the cutoff valve 22, the pressure reducing valve 23 and the ejector 24.

An outlet of the anode channel 11 is connected to a diluter 32, which will be described later, through piping 25a, the purge valve 25 and piping 25b. A middle portion of the piping 25a is connected to the ejector 24 through piping 25c.

The purge valve 25 is an on-off valve (solenoid valve) in which opening and closing (or a degree of opening) of a valve element (not shown) is controlled in accordance with a control signal from the ECU 70, and is set to be in a closed state in which the valve element is seated in a seating portion, during electricity generation of the fuel cell stack 10. With this configuration, an anode off-gas containing unreacted hydrogen discharged from the anode channel 11 is made to be returned to the ejector 24 through the piping 25c. The returned hydrogen is supplied again to the anode channel 11, and hydrogen is recycled. In other words, the fuel cell system 1 has a hydrogen circulating system in which hydrogen is recycled, and configured in such a manner that hydrogen is efficiently utilized.

On the other hand, as hydrogen circulates, an amount of impurities (water vapor, nitrogen and the like) along with the circulating hydrogen may become large. When the output of the fuel cell stack 10 and/or a single cell becomes low, in order to expel the impurities, the valve element of the purge valve 25 is made to be away from the seating portion to open the valve, and the anode off-gas is supplied to the diluter 32.

In addition, the purge valve 25 is configured to be opened appropriately by the ECU 70 at the initiation of the system, in order to replace the gas in the anode channel 11 by hydrogen to increase the hydrogen concentration in the anode channel 11.

The temperature sensor 26 is provided on the piping 25a, which is configured to detect a temperature in the piping 25a as a system temperature T1 of the fuel cell system 1. The temperature sensor 26 is connected to the ECU 70, which is configured to detect the system temperature T1 of the fuel cell system 1. It should be noted that, instead of the temperature sensor 26, an ambient temperature sensor (not shown) may be provided, and the temperature detected by the ambient temperature sensor may be used as the system temperature T1.

The cathode system includes: a compressor (oxidant gas supply unit) 31 which is operated with the fuel cell stack 10 or a battery (not shown) as a power source; the diluter 32 (diluting unit); a hydrogen concentration sensor 33 (concentration detector); and a back-pressure control valve 34.

The compressor 31 is connected to an inlet of the cathode channel 12 through piping 31a, and is configured to take in oxygen-containing air when the compressor 31 is operated in accordance with a command by the ECU 70, and supplies the oxygen-containing air to the cathode channel 12. In addition, on the piping 31a, a humidifier (not shown) is disposed, which appropriately humidifies air to be supplied to the cathode channel 12. It should be noted that, when the fuel cell stack 10 is scavenged, air from the compressor 31 bypasses the humidifier, and unhumidified air is supplied as a scavenging gas to the anode channel 11 and/or the cathode channel 12.

An outlet of the cathode channel 12 is connected to the diluter 32 through piping 32a, and is configured to supply a cathode off-gas discharged from the cathode of the fuel cell stack 10 to the diluter 32.

The diluter 32 is configured to mix the anode off-gas from the anode system through the opened purge valve 25 and the cathode off-gas (oxidant gas, dilution gas) discharged from the cathode channel 12, to thereby dilute hydrogen in the anode off-gas. The diluter 32 has a dilution space for mixing these gases and diluting hydrogen. The diluted gas (post-dilution gas) is to be exhausted out of the vehicle (to outside) through the piping 32b.

The hydrogen concentration sensor 33 is disposed on piping 32b, which is configured to detect a hydrogen concentration (e.g., a first specific concentration and a second specific concentration, which will be described later) in the post-dilution gas to be exhausted out of the vehicle after the dilution in the diluter 32. The hydrogen concentration sensor 33 is connected to the ECU 70, which is configured to detect the hydrogen concentration.

At a middle portion of the piping 32a communicating the outlet of the cathode channel 12 and the diluter 32, the back-pressure control valve 34 is provided which balances a pressure of hydrogen supplied to the anode channel 11 and a pressure of air supplied to the cathode channel 12. The back-pressure control valve 34 is formed of, for example, a butterfly valve or the like, and opening and closing of the valve element is controlled, or a degree of opening of the valve element is adjusted to become a specific angle, in accordance with a control signal from the ECU 70.

The scavenging system is configured to lead a scavenging gas from the cathode system to the anode system during scavenging of the fuel cell stack 10, and has a scavenging valve (scavenging unit) 41 which is configured to be in an opened state where a valve element is away from a seating portion, only during the scavenging. A middle portion of the piping 31a is connected to a middle portion of the piping 24a through piping 41a, the scavenging valve 41 and piping 41b. When the ECU 70 activates the compressor 31, the scavenging gas (unhumidified air from the compressor 31) is supplied to the cathode channel 12 as well as the anode channel 11 through the scavenging valve 41 and the like.

The dilution assist system is configured to assist dilution of hydrogen introduced from the anode system to the diluter 32, when hydrogen is purged by the purge valve 25 during cathode scavenging or anode scavenging.

The dilution assist system includes: assist piping (assist passage) 50 which is branched from the piping 31a connected to the compressor 31 and communicates with the dilution space in the diluter 32; and a dilution assist valve (dilution assist unit) 52 disposed on a middle portion of the assist piping 50 and configured to open and close a fluid passage in the assist piping 50. The dilution assist valve 52 is formed of an on-off valve, such as solenoid valve, and in accordance with an energizing or deenergizing signal from the ECU 70 sent to a solenoid part (not shown), a valve element (not shown) is away from a seating portion to open the valve, or seated in the seating portion to close the valve.

An IG 61 is a switch for activating the fuel cell vehicle and the fuel cell system 1, disposed near a driver's seat. The IG 61 is connected to the ECU 70, which detects an ON/OFF signal from the IG 61.

The ECU 70 is a control unit which electronically controls the fuel cell system 1, and includes CPU, ROM, RAM, various interfaces, electronic circuit and the like. The ECU 70 performs various processes in accordance with various programs stored therein.

In the case where fuel cell system 1 suffers a low-temperature environment during the system shutdown and where an inside of the system including the fuel cell stack 10 would be frozen, the ECU 70 appropriately controls the purge valve 25, the compressor 31, the scavenging valve 41 and the like, and as will be described later, performs scavenging of the fuel cell stack 10, to fill the anode channel 11 and the cathode channel 12 with the scavenging gas (unhumidified air).

In addition, the ECU 70 has a function of purging the fuel cell stack 10 at an appropriate timing, for example, at the initiation of electricity generation, utilizing a built-in clock, in addition to a function of purging immediately after a shutdown of electricity generation, which will be described later.

Moreover, the ECU 70 has a function of detecting a present total purging amount (total discharged amount) of gas sent to the diluter 32, by opening the purge valve 25 during a halt of electricity generation with the IG 61 being turned off.

Specifically, the ECU 70 calculates a present total purging amount, based on a pressure on upstream side of the purge valve 25 (secondary pressure of the pressure reducing valve 23), an opening degree of the purge valve 25 (cross sectional area of the gas channel in the valve-opened state) and an opening period of the purge valve 25. Alternatively, a flow sensor (not shown) may be provided on the piping 25b, and the present total purging amount can be calculated based on a flow rate (L/min) detected by the flow sensor and an opening period of the purge valve 25. When the purge valve 25 is opened and closed multiple times, the present total purging amount can be obtained as a sum of the purging amounts for multiple openings of the purge valve 25.

In addition, in the case where the purge valve 25 is in an opened state and gas in the anode channel 11 and the like is supplied to the diluter 32, the ECU 70 has a function of determining not to open the purge valve 25 from then on, if the hydrogen concentration of the post-dilution gas is the upper limit concentration (first specific concentration, which will be described later) or more Further, the ECU 70 has a function of closing the purge valve 25 and maintaining the purge valve 25 in the closed state, when it is determined that opening of the purge valve 25 is not allowed, i.e. when the hydrogen concentration in the post-dilution gas is the upper limit concentration (first specific concentration) or more, as described above.

Furthermore, the ECU 70 has a function of deenergizing and closing a dilution assist valve 52 to thereby stop the supply of the dilution assist gas to the diluter 32, when the concentration of hydrogen exhausted from the diluter 32, which is detected by the hydrogen concentration sensor 33, is less than a second specific concentration, which will be described later.

Next, the operation of the fuel cell system 1 during the system shutdown by turning off the IG 61 will be described along with a first program (flowchart in FIG. 2 and time chart in FIG. 3) set in the ECU 70. The first program is characterized in that it performs a dilution assist by operating the dilution assist valve 52 during cathode scavenging.

When a driver turns off the IG61 to stop the fuel cell vehicle, the ECU 70 detects an OFF signal from the IG 61 and then determines whether or not scavenging of the fuel cell stack 10 is necessary (step S1).

For example, when a system temperature T1 detected by the temperature sensor 26 during the off period of the IG 61 is less than a specific determination temperature (e.g., 0° C.) (step S1: Yes→step S2), the ECU 70 determines that scavenging is necessary. On the other hand, when the system temperature T1 detected by the temperature sensor 26 is the specific determination temperature (e.g., 0° C.) or more (step S1: No→step S14), the ECU 70 determines that scavenging is not necessary and shuts down the system (step S14). It should be noted that, when the ECU 70 determines whether or not scavenging is necessary, it is preferable that the ECU 70 refers other information data, such as weather information, in addition to the system temperature T1.

When it is determined in the step S1 that scavenging is necessary, the ECU 70 first begins a cathode scavenging control (step S2). Specifically, the ECU 70 controls the amount of air supplied from the compressor 31 to be a first specific flow rate (see air supply flow rate shown in FIG. 3), and closes the cutoff valve 22 while the operation of the compressor 31 is continued, to thereby halt electricity generation by the fuel cell stack 10.

At the same time, the ECU 70 energizes the back-pressure control valve 34 to open it, and thus allows air taken from the compressor 31 to pass the cathode channel 12, to thereby perform cathode scavenging. Therefore, the scavenging gas (unhumidified air) is supplied to the cathode channel 12 from the compressor 31, and residual moisture in the cathode channel 12 is expelled through the piping 32*a* and the like to outside.

With this configuration, when electricity generation by the fuel cell stack 10 is shut down (the IG 61 is turned off), residual water in the cathode channel 12 is expelled to the atmosphere through the piping 32*b* of the diluter 32. It should be noted that the rotation speed of the compressor 31 at that time is a rotation speed which is capable of supplying air at a flow rate sufficient to blow off the produced water. In addition, during the cathode scavenging, the scavenging valve 41 is maintained in a closed state.

Subsequently, the ECU 70 determines whether or not anode purge is necessary, based on a target flow rate to be purged and the like, which rate is obtained by opening the purge valve 25 during cathode scavenging (step S3). When the ECU 70 determines that the present purging flow rate reaches the target flow rate to be purged and anode purge is not necessary (step S3: No→step S11), the process advances to the step S11.

On the other hand, when the present purging flow rate does not reach the target flow rate to be purged and it is determined that anode purge is necessary (step S3: Yes→step S4), the ECU 70 further determines, based on a detection signal from the hydrogen concentration sensor 33, whether or not the concentration of hydrogen exhausted from the diluter 32 is less than the first specific concentration and thus whether or not it is possible to purge hydrogen to the atmosphere (step S4). This first specific concentration of hydrogen means, for example, an upper limit value of the hydrogen concentration at which hydrogen does not catch fire, and an upper limit concentration at which hydrogen can be exhausted to outside (atmosphere) through the piping 32*b* connected to the diluter 32.

When the ECU 70 determines in the step S4, based on the detection signal from the hydrogen concentration sensor 33, that the concentration of hydrogen exhausted from the diluter 32 is the first specific concentration or more (step S4: No→step S5), the purge valve 25 is maintained in the closed state (or when the purge valve 25 is in the opened state, the state of the purge valve 25 is switched to the closed state), the process advances to a step S7, which will be described later.

On the other hand, when the ECU 70 determines in the step S4, based on the detection signal from the hydrogen concentration sensor 33, that the concentration of hydrogen exhausted from the diluter 32 is less than the first specific concentration (step S4: Yes→step S6), the state of the purge valve 25 is switched to the opened state (step S6) based on a pulse signal, which will be described later, to thereby perform purging. In this case, hydrogen purged from the purge valve 25 is introduced to the diluter 32 and diluted with a dilution gas.

Next, the ECU 70 determines whether or not the concentration of hydrogen exhausted from the diluter 32 is the second specific concentration or more, based on the detection signal from the hydrogen concentration sensor 33 (step S7).

Specifically, the concentration of hydrogen exhausted from the piping 32*b* to outside of the vehicle is less than the first specific concentration, which is the upper limit concentration, when the specific amount of hydrogen is started to be introduced to the diluter 32 through the purge valve 25 in the opened state. However, if this state is maintained, the concentration would exceed the first specific concentration. Thus the ECU 70 determines whether or not the concentration becomes the second specific concentration or more, which is a high concentration requiring a dilution assist, based on a detection signal from the hydrogen concentration sensor 33 (herein, first specific concentration>second specific concentration). When it is estimated that the concentration of hydrogen exhausted from the diluter 32 would become the first specific concentration or more, the dilution assist valve 52 is opened to increase a dilution gas, to thereby assist dilution for reducing the hydrogen concentration. (For example, if it is estimated that the hydrogen concentration would eventually become less than the second specific concentration, the dilution assist is not necessarily performed.)

Figure 3:
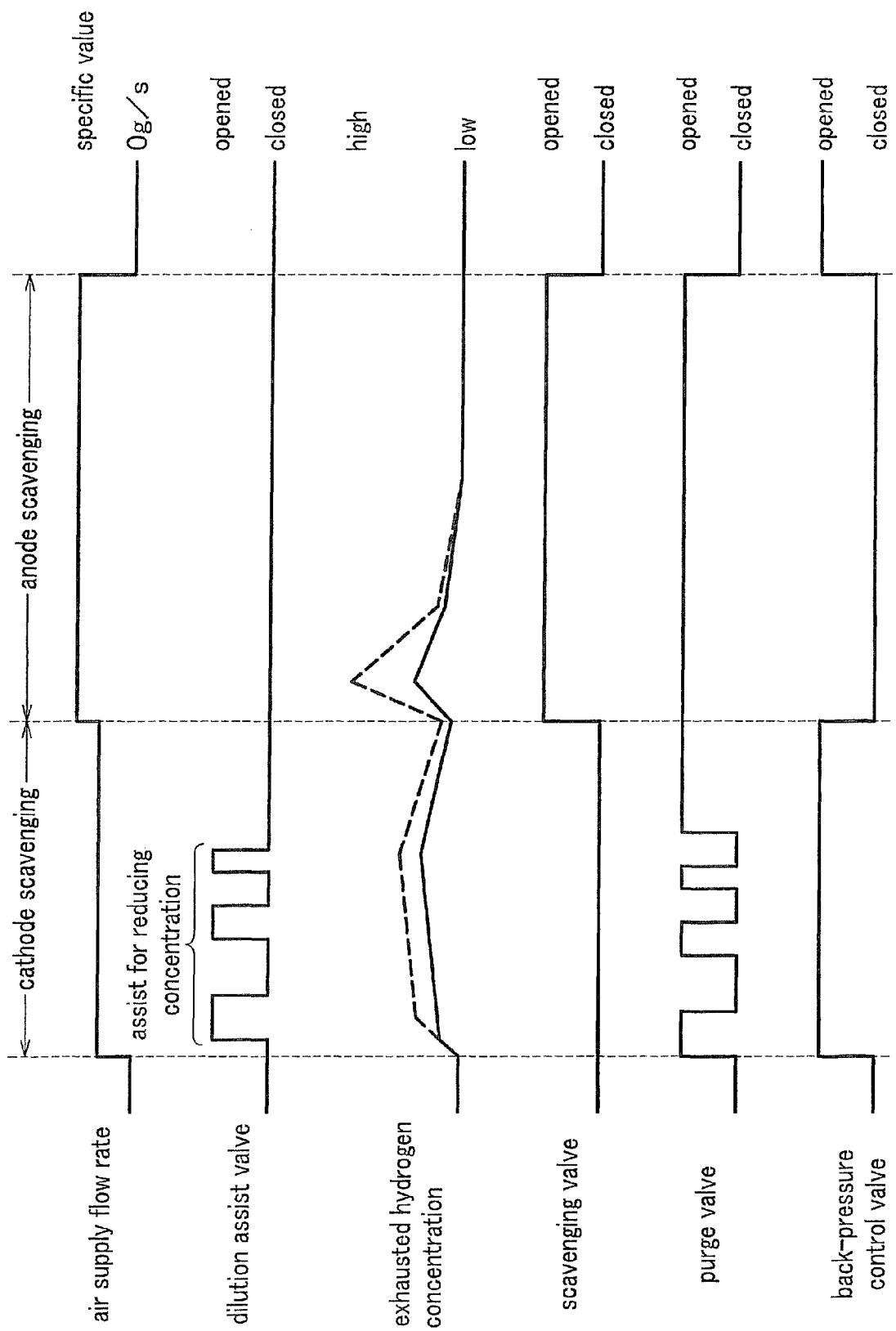
FIG. 3 is a time chart associated with the process shown in FIG. 2.

Switching between the opening and closing states of the purge valve 25 is, as shown in FIG. 3, controlled by a pulse signal which is composed of a first pulse with a largest pulse width, a second pulse with a medium pulse width which is subsequent to the first pulse, and a third pulse with a smallest pulse width which is subsequent to the second pulse.

In the step S7, when the ECU 70 determines that the hydrogen concentration detected by the hydrogen concentration sensor 33 is the second specific concentration or more (step S7: Yes→step S8), the ECU 70 also determines that it is necessary to assist the dilution in the diluter 32, and controls the dilution assist valve 52 based on a pulse signal (step S8).

The pulse signal for controlling the dilution assist valve 52 is composed of, as shown in FIG. 3, a first pulse with a largest pulse width, a second pulse with a medium pulse width which is subsequent to the first pulse, and a third pulse with a smallest pulse width which is subsequent to the second pulse, and has the same pulse shape as that of the pulse signal for controlling the purge valve 25.

Switching between the opening and closing of the dilution assist valve 52 is controlled by the pulse signal. It should be noted that, as shown in FIG. 3, the rise time of the first pulse of the pulse signal controlling the dilution assist valve 52 is delayed with a specific time lag as compared with the rise time of the first pulse of the pulse signal controlling the purge valve 25. The reason is that the dilution assist valve 52 and the purge valve 25 are not cooperatively linked.

By maintaining the dilution assist valve 52 in an opened state, an unhumidified assist gas (air) from the compressor 31 which does not pass the fuel cell stack 10 is supplied to the diluter 32 through the assist piping 50. In this manner, by supplying the unhumidified assist gas to the diluter 32 to thereby assist dilution, hydrogen of high concentration which is the second specific concentration or more is reduced to less than the second specific concentration, and is exhausted to outside through the piping 32b.

In the step S7, when the hydrogen concentration detected by the hydrogen concentration sensor 33 is less than the second specific concentration, the ECU 70 determines that the dilution assist is not necessary, and maintains the dilution assist valve 52 in a closed state (or when the dilution assist valve 52 is in the opened state, closes the dilution assist valve 52) (step S9), and the process advances to a step S10, which will be described later. In this manner, when the concentration of hydrogen exhausted from the diluter 32 is less than the second specific concentration, the dilution assist valve 52 is closed and the supply of the dilution assist gas is stopped, and therefore, by performing the dilution assist only when it is necessary, it becomes possible to reduce power consumption, for example, by the compressor 31 during the dilution assist, and at the same time, to reduce noise during the assist.

Subsequently, the ECU 70 determines whether or not the purging is completed, based on either a time period elapsed (set value by a timer) during which the hydrogen amount in the anode channel 11 is supposed to become a specific value or less, or a purging total flow rate (volume flow rate) obtained using a sum of pulse widths for the opened purged valve 25 (step S10).

When the ECU 70 determines that the purging is completed (step S10: Yes→step S11), the ECU 70 further determines whether or not the cathode scavenging is completed (step S11). On the other hand, when the ECU 70 determines that the purging is not completed (step S10: No→step S3), the procedure returns to the step S3 and it is determined again whether or not the anode purge is necessary. In this case, whether or not the cathode scavenging is completed is determined based on a total time period in which the back-pressure control valve 34 is maintained in an opened state or a total flow rate (volume flow rate) of air supplied from the compressor 31 to the cathode channel 12. It should be noted that, after the ECU 70 determines that the purging is completed at the step S10, as shown in FIG. 3, by maintaining an opening state of the purge valve 25, hydrogen is sucked in the diluter 32 and suitably exhausted to outside.

In the step S11, when it is determined that the cathode scavenging is completed (step S11: Yes→step S12), the ECU 70 performs an anode scavenging control, subsequently to the cathode scavenging (step S12).

In this anode scavenging, the rotation speed of the compressor 31 is augmented by a specific amount as compared with the case of the cathode scavenging, and thus the scavenging gas (unhumidified air) is supplied to the anode channel 11 with the air supply flow rate being augmented by a specific amount (see FIG. 3). Specifically, the ECU 70 switches the scavenging valve 41 from the closed state to the opened state to communicate the piping 41a, 41b and 24a, and while maintaining the opened state of the purge valve 25, supplies unhumidified air from the compressor 31 as a scavenging gas to the anode channel 11.

It should be noted that, as shown in FIG. 3, by switching the back-pressure control valve 34 from the opened state to a closed state upon the initiation of the anode scavenging, air supply to the diluter 32 from the cathode side is stopped. During the anode scavenging, the dilution assist valve 52 is maintained in the closed state without being activated, as shown in FIG. 3.

By the anode scavenging, moisture (water vapor) in the anode channel 11, moisture attached to the anode of the MEA, and residual hydrogen and moisture in the piping 24a, 25a, 25c are exhausted through the diluter 32 and the like to outside. At the same time, in the anode channel 11, replacement of hydrogen by air is promoted.

Further, the ECU 70 determines whether or not the anode scavenging is completed after a specific time period from the initiation of the anode scavenging (step S13), and when it is determined that the anode scavenging is completed, the ECU 70 stops the compressor 31, and closes the purge valve 25 and the scavenging valve 41 to shut down the system (step S14). In this case, when the anode scavenging is not completed, the process of the step S13 is repeated until it is determined that the anode scavenging is completed, and in the step S13, when it is determined that the anode scavenging is completed, the system is shut down (step S14).

In this manner, the anode channel 11, the cathode channel 12, the piping 25a, 32a and the like are scavenged, in other words, moisture in the anode channel 11 and the like are exhausted to outside, and as a result, the inside of the fuel cell stack 10 and the like becomes unlikely to be frozen. In addition, since the anode channel 11 and the cathode channel 12 are filled with the scavenging gas (unhumidified air), the OCV is not generated in each single cell of the fuel cell stack 10 during the system shutdown. Therefore, no current conductance occurs in each single cell which may otherwise occur due to the generation of the OCV, and no deterioration of the MEA (such as electrolysis of the electrolyte membrane) occurs, rendering a higher durability to the fuel cell stack 10. In addition, since the catalyst is not exposed to a high voltage for a long time period, the catalyst is prevented from being deteriorated.

In FIG. 3, the concentration of the exhausted hydrogen is a value obtained from, for example, the concentration of hydrogen contained in the post-dilution gas exhausted from the diluter 32 measured by the hydrogen concentration sensor 33, and a solid line shows a concentration characteristic curve by the first program which is characterized by the activation of the dilution assist valve 52 during the cathode scavenging, while a broken line shows a concentration characteristic curve according to a comparative embodiment in which no dilution assist valve 52 is provided and no dilution assist is performed.

In the first program, during the cathode scavenging which precedes the anode scavenging, the dilution assist valve 52 is activated to supply a dilution assist gas to the diluter 32, to thereby assist the dilution in the diluter 32. With this configuration, as compared with the comparative embodiment, hydrogen is suitably diluted to a low concentration in an entire cathode scavenging and anode scavenging, and at the same time, a peak concentration of the comparative embodiment, which is generated by a rapid increase in the hydrogen flow rate during the initiation of the anode scavenging, can be suppressed so as to obtain a low-concentration characteristic curve with a gentle mountain-shaped profile.

As a result, even when the purging is performed during the scavenging (cathode scavenging and anode scavenging), high-concentration hydrogen is suitably prevented from being exhausted from the diluter 32. It should be noted that, the present exhausted hydrogen concentration in the post-dilution gas may be estimated, for example, based on a table (not shown) set in advance in accordance with an opening period of the purge valve 25 and stored in a memory unit of the ECU 70, instead of providing the hydrogen concentration sensor 33.

Figure 4:
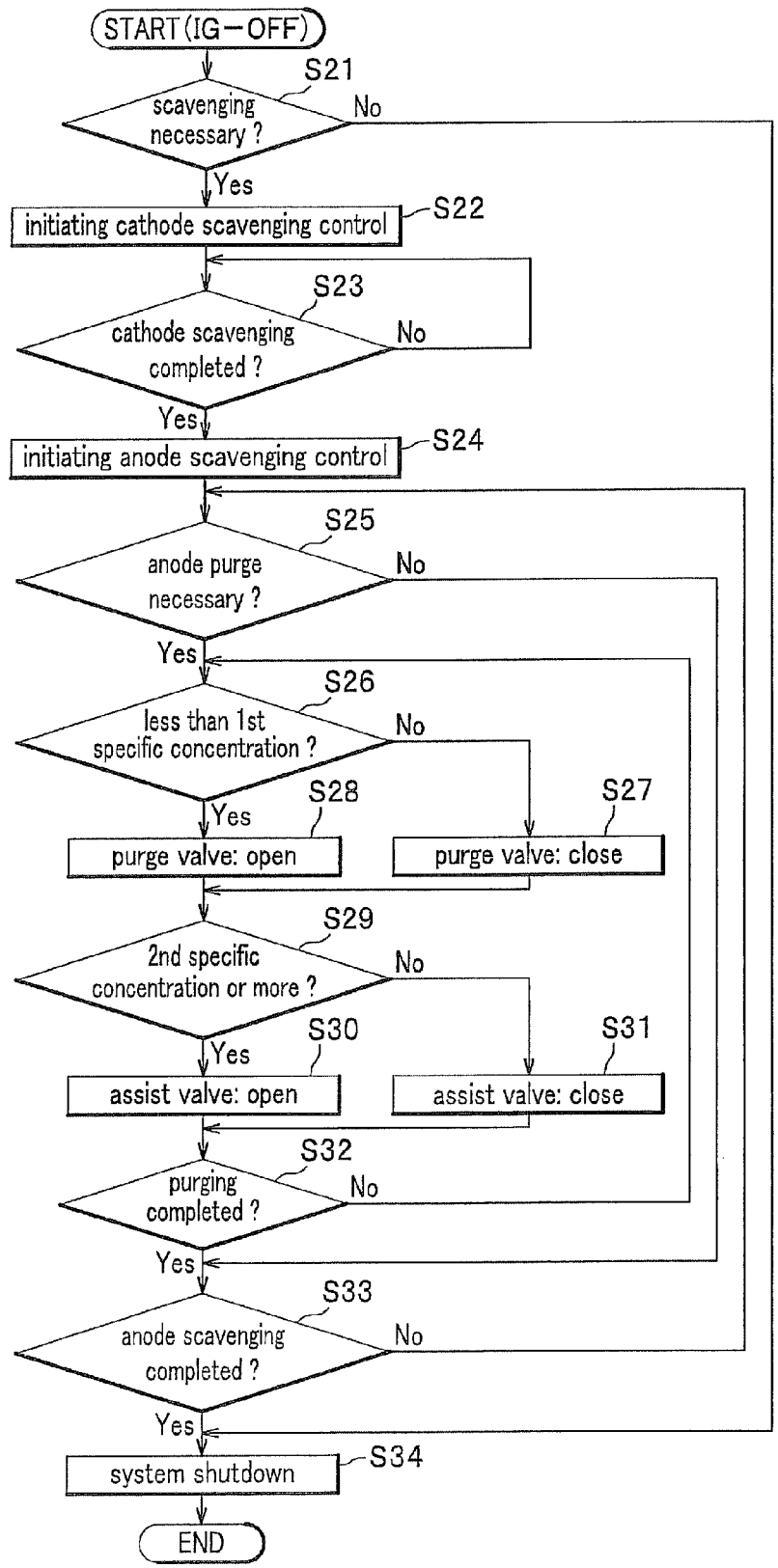
FIG. 4 is a flowchart showing a process in accordance with a second program during a halt of a fuel cell system according to an embodiment of the present invention.

Next, the operation of the fuel cell system 1 during the system shutdown by turning off the IG 61 will be described along with a second program (flowchart in FIG. 4 and time chart in FIG. 5) set in the ECU 70. The second program is characterized in that it performs a dilution assist by operating the dilution assist valve 52 at the same time as the initiation of anode scavenging.

When a driver turns off the IG61 to stop the fuel cell vehicle, the ECU 70 detects an OFF signal from the IG 61 and then determines whether or not scavenging of the fuel cell stack 10 is necessary (step S21).

For example, when a system temperature T1 detected by the temperature sensor 26 during the off period of the IG 61 is less than a specific determination temperature (e.g., 0° C.) (step S21: Yes→step S22), the ECU 70 determines that scavenging is necessary.

On the other hand, when the system temperature T1 detected by the temperature sensor 26 is the specific determination temperature (e.g., 0° C.) or more (step S21: No→step S34), the ECU 70 determines that scavenging is not necessary and shuts down the system (step S34). It should be noted that, when the ECU 70 determines whether or not scavenging is necessary, it is preferable that the ECU 70 refers other information data, such as weather information, in addition to the system temperature T1. It should be noted that a switch (not shown) operable by a driver may be provided in a vehicle interior, and it may be determined whether or not scavenging is requested, by monitoring the operation of the switch.

When it is determined in the step S21 that scavenging is necessary, the ECU 70 first begins a cathode scavenging control including purging (step S22). Specifically, the ECU 70 controls the amount of air supplied from the compressor 31 to a first specific flow rate (see air supply flow rate shown in FIG. 5), and closes the cutoff valve 22 while the operation of the compressor 31 is continued, to thereby halt electricity generation by the fuel cell stack 10.

Figure 5:
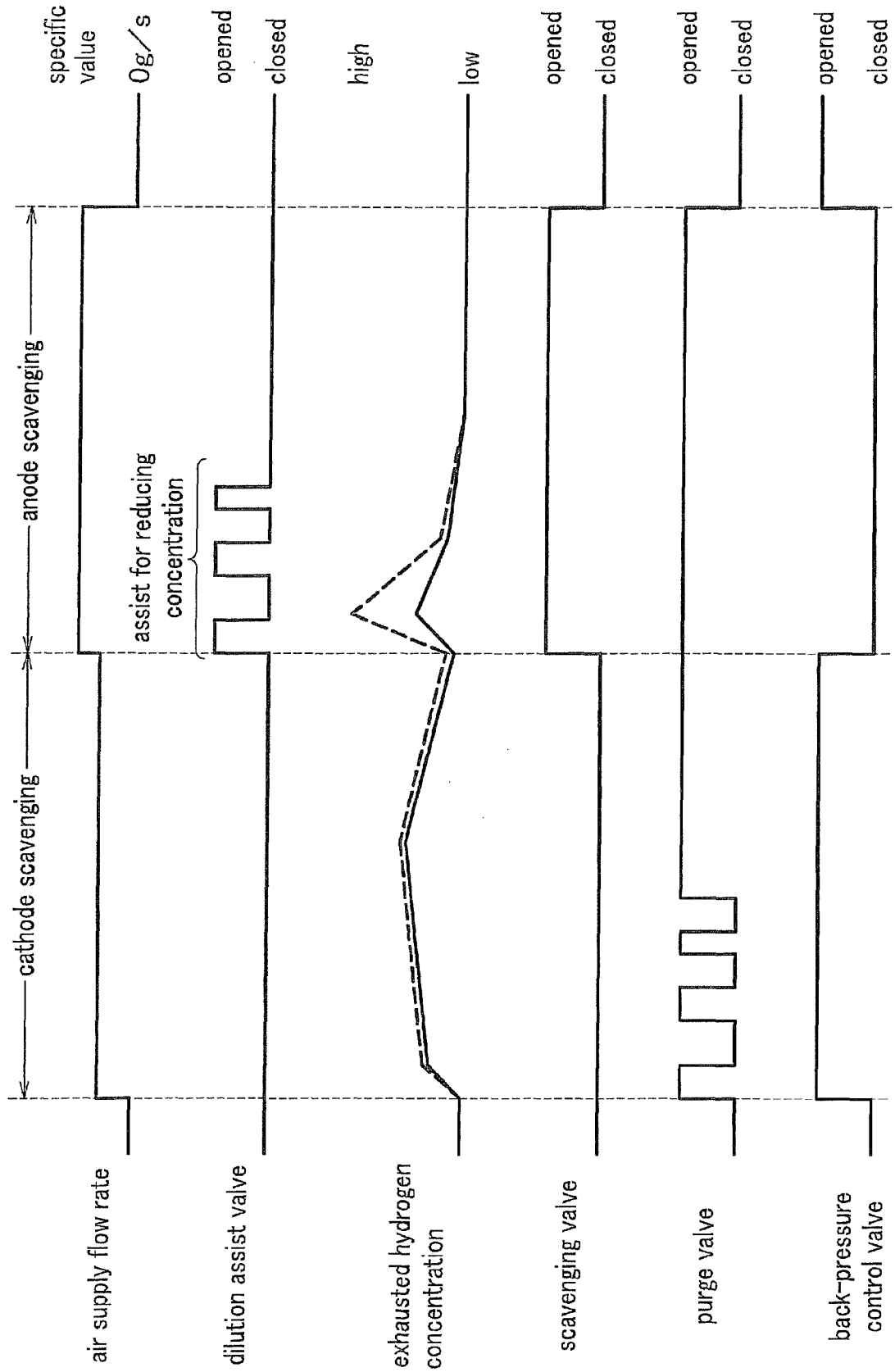
FIG. 5 is a time chart associated with the process shown in FIG. 4.

At the same time, the ECU 70 energizes the back-pressure control valve 34 to open it, and thus allows air taken from the compressor 31 to pass the cathode channel 12, to thereby perform cathode scavenging, and at the same time, based on a pulse signal shown in FIG. 5, controls opening and closing of the purge valve 25 to perform purging. Therefore, the scavenging gas (unhumidified air) is supplied to the cathode channel 12 from the compressor 31, and residual moisture in the cathode channel 12 is expelled through the piping 32a and the like to outside, and in addition, hydrogen purged through the purge valve 25 is introduced to the diluter 32 where it is diluted, and exhausted to outside through the piping 32b.

With this configuration, when electricity generation by the fuel cell stack 10 is shut down (the IG 61 is turned off), residual water in the cathode channel 12 is expelled to the atmosphere through the piping 32b of the diluter 32. It should be noted that the rotation speed of the compressor 31 at that time is a rotation speed which is capable of supplying air at a flow rate sufficient to blow off the produced water. In addition, during the cathode scavenging, the scavenging valve 41 and the dilution assist valve 52 are maintained in the closed state (see FIG. 5).

Subsequently, the ECU 70 determines whether or not the cathode scavenging is completed (step S23). In this case, whether or not the cathode scavenging is completed is determined based on whether or not a reference value is met, which is set in advance in accordance with a total time period in which the back-pressure control valve 34 is maintained in the opened state or a total flow rate (volume flow rate) of air supplied from the compressor 31 to the cathode channel 12.

In the step S23, when it is determined that the cathode scavenging is completed (step S23: Yes→step S24), the ECU 70 performs an anode scavenging control, subsequently to the cathode scavenging (step S24). On the other hand, when it is determined that the cathode scavenging is not completed (step S23: No→step S23), the procedure returns to the step S23 and it is determined again whether or not the cathode scavenging is completed. The process of the step S23 is repeated until it is determined that the cathode scavenging is completed.

In the anode scavenging, the rotation speed of the compressor 31 is augmented by a specific amount as compared with the case of the cathode scavenging, and thus the scavenging gas (unhumidified air) is supplied to the anode channel 11 with the air supply flow rate being augmented by a specific amount (see FIG. 5). Specifically, the ECU 70 switches the scavenging valve 41 from the closed state to the opened state to communicate the piping 41a, 41b and 24a, and supplies the unhumidified air from the compressor 31 as a scavenging gas to the anode channel 11.

It should be noted that, as shown in FIG. 5, by switching the back-pressure control valve 34 from the opened state to the closed state upon the initiation of the anode scavenging, air supply to the diluter 32 from the cathode side is stopped.

By the anode scavenging, moisture (water vapor) in the anode channel 11, moisture attached to the anode of the MEA, and residual hydrogen and moisture in the piping 24a, 25a, 25c are exhausted through the diluter 32 and the like to outside. At the same time, in the anode channel 11, replacement of hydrogen by air is promoted.

Subsequently, the ECU 70 determines whether or not anode purge is necessary, based on a target flow rate to be purged and the like, which rate is obtained by opening the purge valve 25 during anode scavenging (step S25). When the ECU 70 determines that the present purging flow rate reaches the target flow rate to be purged and the anode purge is not necessary (step S25: No→step S33), the process advances to the step S33.

On the other hand, when the present purging flow rate does not reach the target flow rate to be purged and it is determined that anode purge is necessary (step S25: Yes→step S26), the ECU 70 further determines, based on a detection signal from the hydrogen concentration sensor 33, whether or not the concentration of hydrogen exhausted from the diluter 32 is less than the first specific concentration, and thus whether or not it is possible to purge hydrogen to the atmosphere (step S26). This first specific concentration of hydrogen means an upper limit concentration at which hydrogen can be exhausted to outside (atmosphere) through the piping 32b connected to the diluter 32.

When the ECU 70 determines in the step S26, based on the detection signal from the hydrogen concentration sensor 33, that the concentration of hydrogen exhausted from the diluter 32 is the first specific concentration or more (step S26: No→step S27), the purge valve 25 is maintained in the closed state (or when the purge valve 25 is in the opened state, the state of the purge valve 25 is switched to the closed state), the process advances to a step S29, which will be described later.

On the other hand, when the ECU 70 determines in the step S26, based on the detection signal from the hydrogen concentration sensor 33, that the concentration of hydrogen exhausted from the diluter 32 is less than the first specific concentration (step S26: Yes→step S28), the state of the purge valve 25 is switched to the opened state (step S28) to thereby perform purging.

It should be noted that FIG. 5 illustrates a case where purging is performed by opening and closing the purge valve 25 during cathode scavenging, and then the purge valve 25 is continuously maintained in the opened state during anode scavenging, subsequently to the cathode scavenging.

Next, the ECU 70 determines whether or not the concentration of hydrogen exhausted from the diluter 32 is the second specific concentration or more, based on the detection signal from the hydrogen concentration sensor 33 (step S29).

Specifically, the concentration of hydrogen exhausted from the piping 32b is less than the first specific concentration, which is the upper limit concentration, when the specific amount of hydrogen is started to be introduced to the diluter 32 through the purge valve 25 in the opened state. The ECU 70 determines whether or not the concentration becomes the second specific concentration or more, which is a high concentration requiring a dilution assist, based on a detection signal from the hydrogen concentration sensor 33 (herein, first specific concentration>second specific concentration). When it is estimated that the concentration of hydrogen exhausted from the diluter 32 would become the specific concentration or more, the dilution assist valve 52 is opened to increase a dilution gas, to thereby assist dilution for reducing the hydrogen concentration. (For example, if it is estimated that the hydrogen concentration would eventually become less than the second specific concentration, the dilution assist is not necessarily performed.)

When the ECU 70 determines that the hydrogen concentration detected by the hydrogen concentration sensor 33 is the second specific concentration or more (step S29: Yes→step S30), the ECU 70 also determines that it is necessary to assist the dilution in the diluter 32, and controls the dilution assist valve 52 based on a pulse signal (step S30). Switching between the opening and closing of the dilution assist valve 52 is, as shown in FIG. 5, controlled by the pulse signal composed of rectangular first to third pulses.

At that time, a rise time of the first pulse in which the dilution assist valve 52 is opened is set to be the same or nearly the same as the timing when the scavenging valve 41 is opened, as shown in FIG. 5. In other words, by simultaneously opening both the scavenging valve 41 for supplying the scavenging gas to the anode channel 11 and the dilution assist valve 52 for supplying a assist gas for assisting the dilution to the diluter 32 through the assist piping 50, a peak concentration, which is generated during the initiation of the anode scavenging, can be suppressed so as to obtain a low-concentration characteristic curve with a gentle mountain-shaped profile (see FIG. 5).

By maintaining the dilution assist valve 52 in the opened state, an unhumidified assist gas (air) from the compressor 31 which does not pass the fuel cell stack 10 is supplied to the diluter 32 through the assist piping 50. In this manner, by supplying the unhumidified assist gas to the diluter 32 to thereby assist dilution, hydrogen of high concentration which is the second specific concentration or more is reduced to less than the second specific concentration, and is exhausted to outside through the piping 32b.

In the step S29, when the hydrogen concentration detected by the hydrogen concentration sensor 33 is less than the second specific concentration (step S29: No→step S31), the ECU 70 determines that the dilution assist is not necessary, and maintains the dilution assist valve 52 in the closed state (or when the dilution assist valve 52 is in the opened state, closes the dilution assist valve 52) (step S31), and the process advances to a step S32, which will be described later. In this manner, when the concentration of hydrogen exhausted from the diluter 32 is less than the second specific concentration, the dilution assist valve 52 is closed and the supply of the dilution assist gas is stopped, and therefore, by performing the dilution assist only when it is necessary, it becomes possible to reduce power consumption, for example, by the compressor 31 during the dilution assist, and at the same time, to reduce noise during the assist.

Subsequently, the ECU 70 determines whether or not the purging is completed, based on either a time period elapsed during which the hydrogen amount in the anode channel 11 is supposed to become a specific value or less, or a purging total flow rate (volume flow rate) obtained using a sum of pulse widths for the opened purge valve 25 (step S32).

When the ECU 70 determines that the purging is completed (step S32: Yes→step S33), the ECU 70 further determines whether or not the anode scavenging is completed (step S33). On the other hand, when the ECU 70 determines that the purging is not completed (step S32: No→step S26), the procedure returns to the step S26 and it is determined again whether or not the anode purge is necessary. In this case, whether or not the anode scavenging is completed is determined based on a total time period in which the back-pressure control valve 34 is maintained in the closed state or a total flow rate (volume flow rate) of air supplied from the compressor 31. It should be noted that, after the ECU 70 determines that the purging is completed at the step S32, as shown in FIG. 5, by maintaining an opening state of the purge valve 25, hydrogen is sucked in the diluter 32 and suitably exhausted to outside.

Further, the ECU 70 determines whether or not the anode scavenging is completed after a specific time period from the initiation of the anode scavenging (step S33), and when it is determined that the anode scavenging is completed, the ECU 70 stops the compressor 31, and closes the purge valve 25 and the scavenging valve 41 to shut down the system (step S34). In this case, when the anode scavenging is not completed, the process from the step S25 to the step S33 is repeated until it is determined that the anode scavenging is completed, and in the step S33, when it is determined that the anode scavenging is completed, the system is shut down (step S34).

In the second program in which the initiation of the pulse signal (first pulse) for controlling the dilution assist valve 52 and the initiation of the opening of the scavenging valve 41 are cooperatively linked, for example, hydrogen which remains in the anode system including the circulation system and cannot be easily exhausted can be forcibly pushed out, by the scavenging gas supplied from the scavenging valve 41, and the concentration of hydrogen pushed out can be suitably reduced by the dilution assist gas supplied by the dilution assist valve 52.

Figure 2:
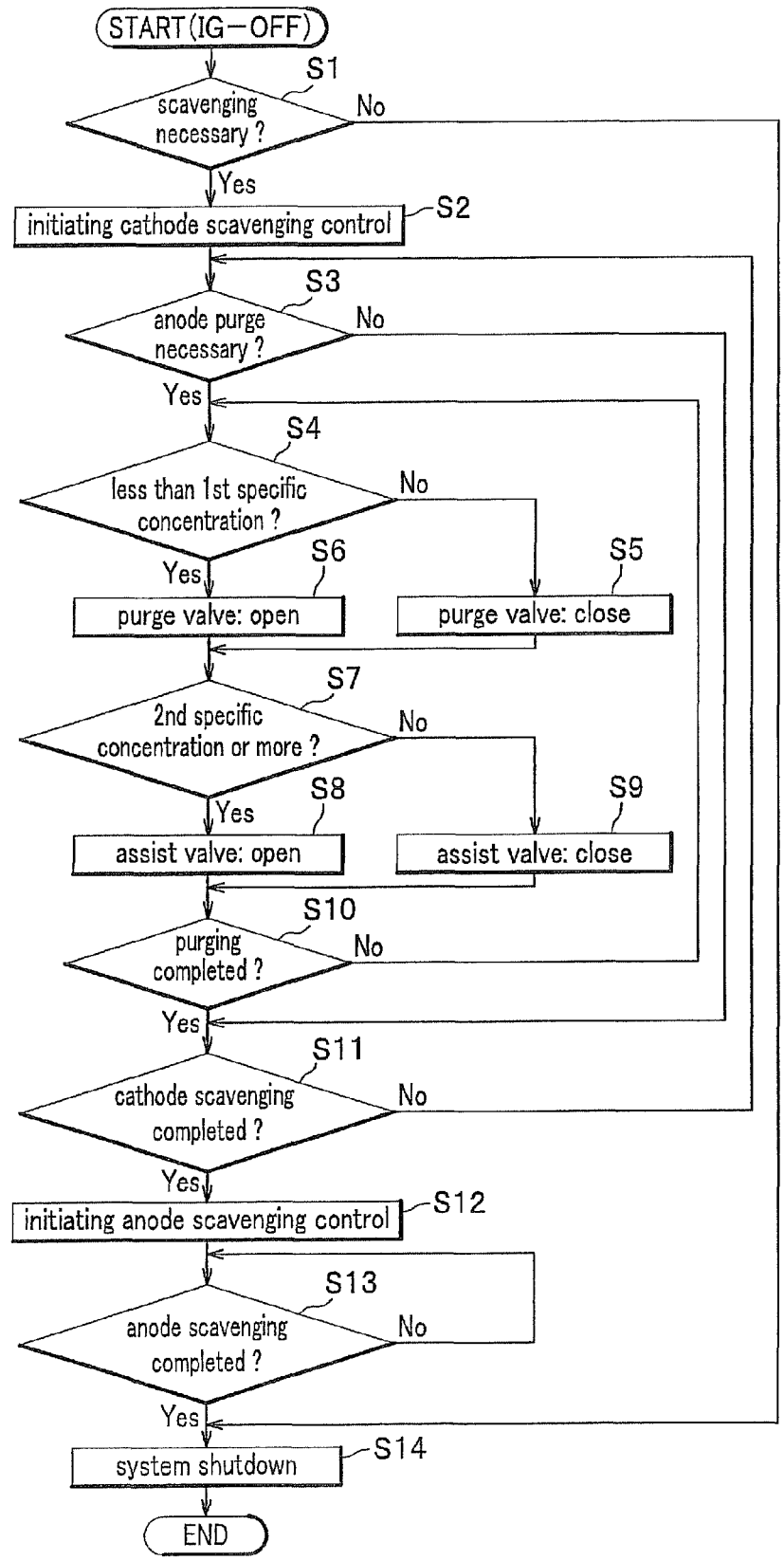
FIG. 2 is a flowchart showing a process in accordance with a first program, during a halt of a fuel cell system according to an embodiment of the present invention.
Figure 6:
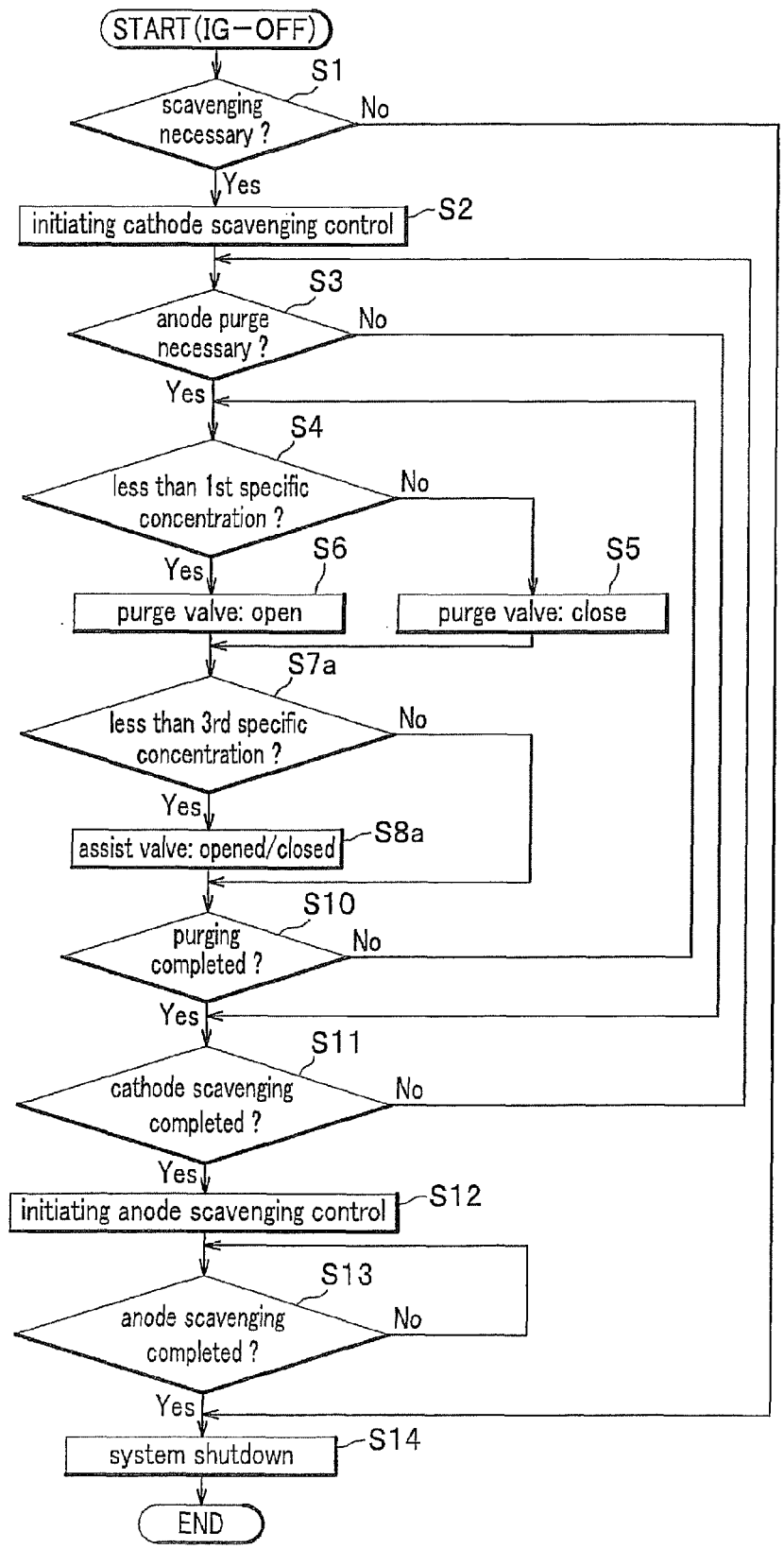
FIG. 6 is a flowchart showing a process in accordance with a third program during a halt of a fuel cell system according to an embodiment of the present invention.

Next, the operation of the fuel cell system 1 during the system shutdown by turning off the IG 61 will be described along with a third program (flowchart in FIG. 6 and time chart in FIG. 7) set in the ECU 70. The third program is characterized in that it performs an assist by operating the dilution assist valve 52 during cathode scavenging, to thereby blow the low-concentration hydrogen in the diluter 32 out of the diluter 32 by the dilution assist gas. The steps which are the same as those of the flowchart in FIG. 2 are designated with the same reference characters, and only the different steps will be described in detail below.

When the ECU 70 determines in the step S4, based on the detection signal from the hydrogen concentration sensor 33, that the concentration of hydrogen exhausted from the diluter 32 is less than the first specific concentration (step S4: Yes→step S6), the state of the purge valve 25 is switched to the opened state (step S6) based on a pulse signal, to thereby perform purging. In this case, hydrogen purged from the purge valve 25 is introduced to the diluter 32.

Next, the ECU 70 determines whether or not the concentration of hydrogen exhausted from the diluter 32 is less than the third specific concentration, which is low, based on the detection signal from the hydrogen concentration sensor 33 (step S7a). The third specific concentration is a hydrogen concentration which is lower than the first specific concentration (upper limit concentration) and the second specific concentration set in the first and second programs, and is the hydrogen concentration that is capable of being pushed out by the dilution assist gas discharged into the diluter 32, as will be described later (herein, first specific concentration>second specific concentration>third specific concentration). It should be noted that the pressure of the dilution assist gas from the dilution assist valve 52 may be a fluid pressure that is enough to push out the low-concentration hydrogen.

In the step S7a, when the ECU 70 determines that the hydrogen concentration detected by the hydrogen concentration sensor 33 is the third specific concentration or less (step S7a: Yes→step S8a), the ECU 70 also determines that it is necessary to assist the diluter 32, and opens and closes the dilution assist valve 52 (step S8a).

Figure 7:
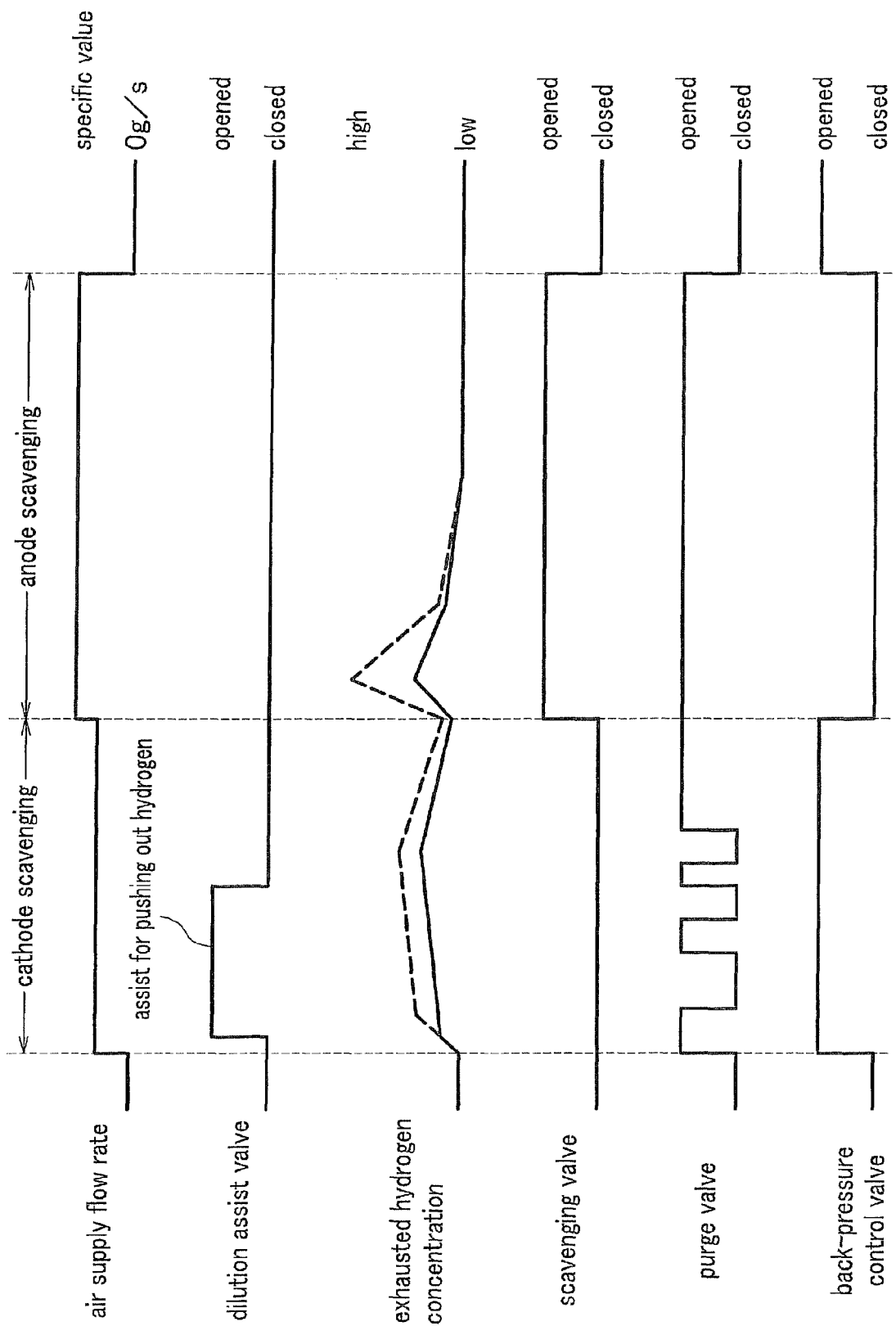
FIG. 7 is a time chart associated with the process shown in FIG. 6.

By continuously maintaining the dilution assist valve 52 in the opened state for a specific time period as shown in the time chart of FIG. 7, an unhumidified assist gas (air) from the compressor 31 which does not pass the fuel cell stack 10 is supplied to the diluter 32 through the assist piping 50. When it is estimated that the concentration of hydrogen exhausted from the diluter 32 is less than the third specific concentration, the dilution assist valve 52 is maintained in the opened state for a specific time period to blow the dilution assist gas into the diluter 32 to thereby forcibly push the low-concentration hydrogen out of the diluter 32.

In the step S7a, when the hydrogen concentration detected by the hydrogen concentration sensor 33 is the third specific concentration or more, the ECU 70 determines that the assist is not necessary, and maintains the dilution assist valve 52 in the closed state (or when the dilution assist valve 52 is in the opened state, closes the dilution assist valve 52) (step S9), and the process advances to a step S10.

In this manner, in the case of the operation of the third program, even in the case where the purge valve 25 is activated to perform purging during cathode scavenging, when the hydrogen concentration in the diluter 32 is less than the third specific concentration, which is low, the dilution assist valve 52 is activated to blow off the low-concentration hydrogen in the diluter 32 to thereby suitably push out hydrogen out of the diluter 32. As a result, by pushing the low-concentration hydrogen out of the diluter 32 by the dilution assist gas, hydrogen purging during scavenging can be smoothly performed to thereby shorten a time period for scavenging.

Next, the operation of the fuel cell system 1 during the system shutdown by turning off the IG 61 will be described along with a fourth program (flowchart in FIG. 8 and time chart in FIG. 9) set in the ECU 70. The fourth program is characterized in that, before the completion of the cathode scavenging in the step S11 and after the completion of the purge in the step S10 in the first program, it performs an assist by operating the dilution assist valve 52, to thereby blow the low-concentration hydrogen and water remaining in the diluter 32 out of the diluter 32 by the dilution assist gas. The steps which are the same as those of the flowchart in FIG. 2 are designated with the same reference characters, and only the different steps will be described in detail below.

Figure 8:
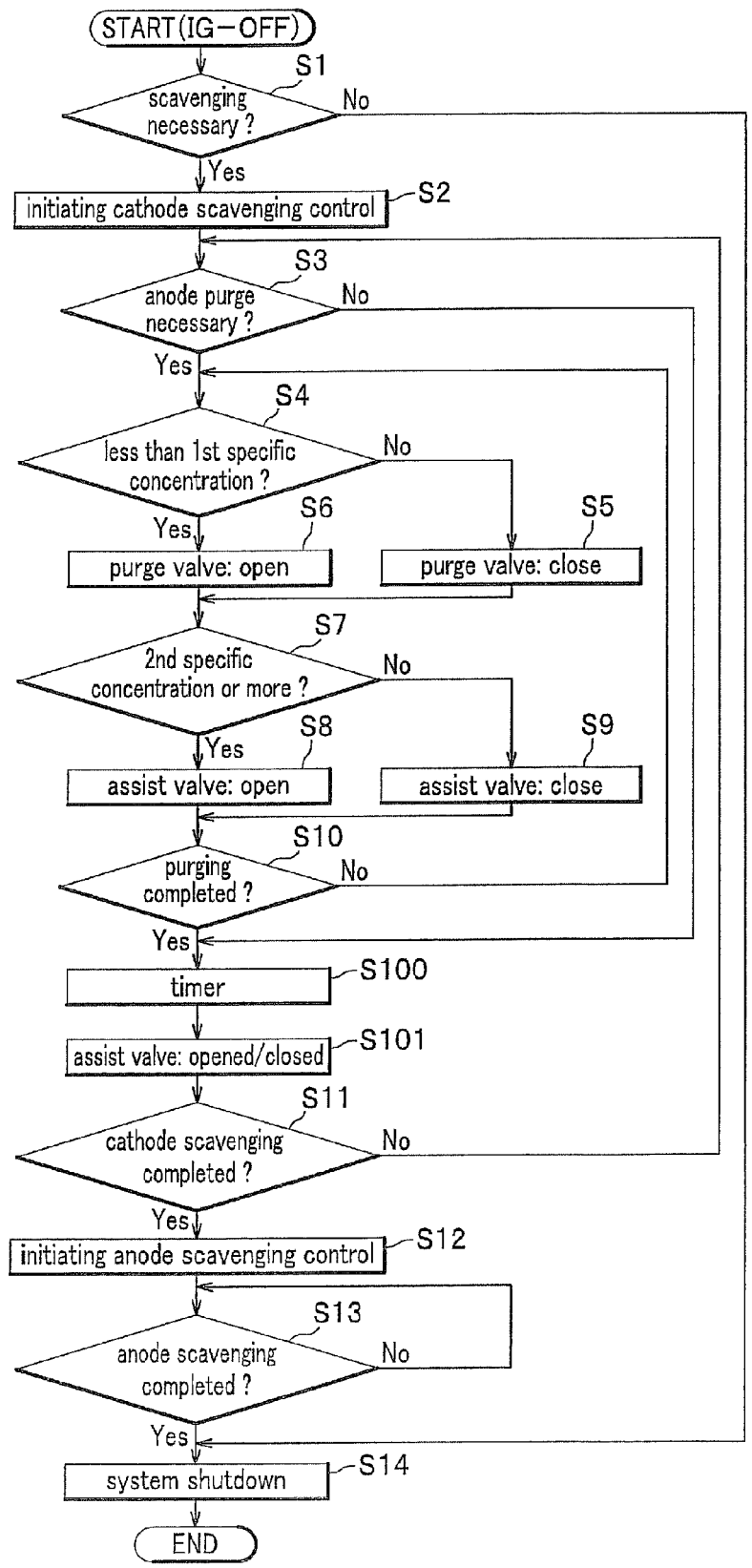
FIG. 8 is a flowchart showing a process in accordance with a fourth program during a halt of a fuel cell system according to an embodiment of the present invention.
Figure 9:
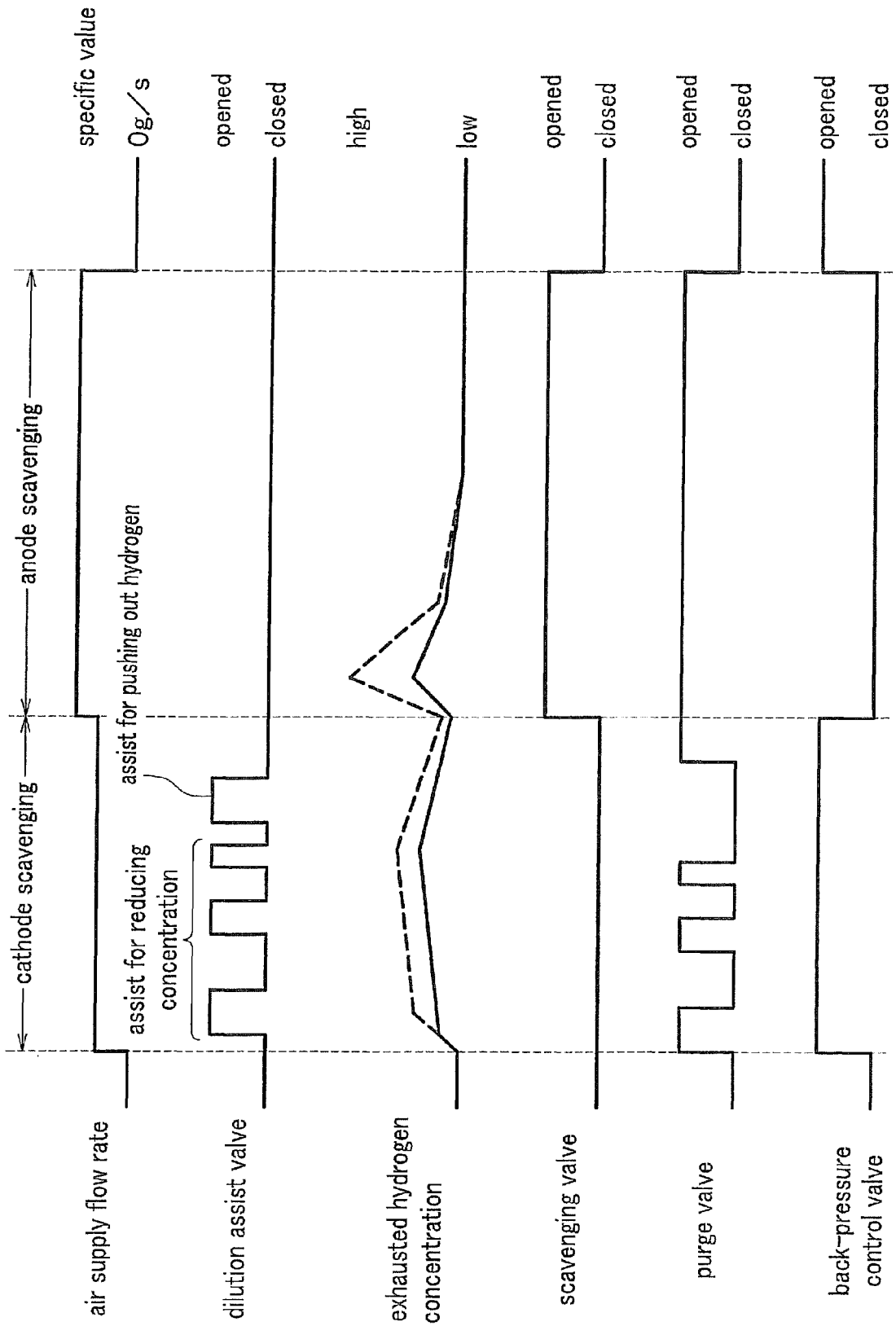
FIG. 9 is a time chart associated with the process shown in FIG. 8.

In the step S10 of FIG. 8, after the purging is completed and a specific time period is elapsed which is counted by a timer (step S100), it is estimated that the hydrogen concentration in the diluter 32 becomes less than the third specific concentration, hydrogen of which concentration is capable of being pushed out, and the assist valve 52 is opened and closed for a specific time period (step S101).

Specifically, by continuously maintaining the dilution assist valve 52 in the opened state for a specific time period, an unhumidified assist gas (air) from the compressor 31 which does not pass the fuel cell stack 10 is supplied to the diluter 32 through the assist piping 50. The unhumidified assist gas is supplied to the diluter 32 to blow off the inside of the diluter 32, and the low-concentration hydrogen, together with the possible residual water in the diluter 32, is suitably pushed to outside through the piping 32b.

In this manner, in the case of the operation of the fourth program, when the hydrogen concentration in the diluter 32 is estimated to be less than the third specific concentration, which is low, the dilution assist valve 52 is activated to blow off the low-concentration hydrogen in the diluter 32 to thereby suitably push out the possible residual water (moisture) out of the diluter 32. As a result, by pushing the low-concentration hydrogen out of the diluter 32 by the dilution assist gas, hydrogen purging during scavenging can be smoothly performed to thereby shorten a time period for scavenging, and at the same time, water is suitably blown off, enhancing water-discharge efficiency.

In the embodiments above, the operations of the system are described with respect to the first program (including the third program and the fourth program) in which the dilution assist is performed by activating the dilution assist valve 52 only during the cathode scavenging, and the second program in which the dilution assist is performed by activating the dilution assist valve 52 simultaneously when the anode scavenging is initiated. However, the present invention is not limited to these programs, and for example, the system may be controlled based on other programs (not shown), such as those in which the dilution assist is performed by activating the dilution assist valve 52 during both cathode scavenging and anode scavenging.

In addition, in the embodiment above, the on-off control is performed based on the pulse signal to intermittently open the dilution assist valve 52. However, the present invention is not limited to this embodiment, and the opening state may be continued for a specific period of time, during any of cathode scavenging and anode scavenging.

Further, in the embodiments above, air supplied from the compressor 31 is utilized as a dilution assist gas. However, the present invention is not limited to this embodiment, and for example, the dilution assist gas may be supplied from a gas tank (not shown) or a ventilation fan, which is separately provided from the compressor 31.

According to the fuel cell system 1, the following, but non-limiting, effects can be obtained.

In the first program and the second program for controlling the fuel cell system 1 according to the present invention, for example, even in the case where purging is operated during a halt of electricity generation, when the hydrogen concentration of the post-dilution gas is the second specific concentration or more which is lower than the first specific concentration (the upper limit concentration), the dilution assist valve 52 is opened and a dilution assist gas is supplied to the diluter 32 and an assist for reducing the hydrogen concentration is performed. As a result, the high-concentration hydrogen is prevented from being exhausted out of the vehicle.

In addition, in the first program in which the dilution assist valve 52 is activated during cathode scavenging which precedes anode scavenging, as compared with the second program in which the dilution assist valve 52 is activated during the anode scavenging, time period for cathode scavenging can be reduced (compare time periods for cathode scavenging in FIG. 3 and FIG. 5). In other words, in the first program, during the cathode scavenging which precedes the anode scavenging, hydrogen purging is performed by the purge valve 25, and at the same time, the dilution assist valve 52 is activated to assist dilution, to thereby reduce hydrogen in the anode channel 11 in advance, and when anode scavenging is performed subsequently to cathode scavenging, the concentration of hydrogen exhausted from the diluter 32 can be reduced to less than the second specific concentration. In this manner, by performing a dilution assist, a time period for dilution by hydrogen purging can be shortened, which in turn shortens the time period for cathode scavenging.

According to the first program and the second program for controlling the fuel cell system 1 of the present invention, even when hydrogen purging is performed during scavenging, by activating the dilution assist valve 52 to supply a dilution assist gas, an amount of gas for dilution in the diluter 32 can be steadily ensured. In addition, though water produced from electricity generation remains in the diluter 32, the flow rate of the dilution gas supplied to the diluter 32 increases, and therefore, the produced water stored in the diluter 32 can be steadily exhaust to outside, enhancing water-discharge efficiency. Accordingly, even when the fuel cell system 1 is used, for example, in a low-temperature environment (e.g., below zero), the produced water in the diluter 32, the piping and the like are prevented from being frozen, ensuring immediate startup in a low-temperature environment.

In addition, according to the first and second programs for controlling the fuel cell system 1 of the present invention, when the concentration of hydrogen exhausted from the diluter 32 is less than the second specific concentration, the supply of the dilution assist gas is stopped by the ECU 70. Therefore, by performing the dilution assist only when it is necessary, it becomes possible to reduce power consumption, for example, by the compressor 31 during the dilution assist, and at the same time, to reduce noise during the assist.

Further, according to the first and second programs for controlling the fuel cell system 1 of the present invention, an unhumidified gas which does not pass the fuel cell stack 10 is used as a dilution assist gas supplied from the dilution assist valve 52, and as compared with a humidified gas which passed the fuel cell stack 10, a pressure loss due to passing the fuel cell stack 10 can be reduced, to thereby reduce a load on the compressor 31.

Moreover, if hydrogen purging is performed for the first time during anode scavenging, there may be a risk that the concentration of hydrogen exhausted from the diluter 32 exceeds the upper limit concentration (first specific concentration). On the other hand, according to the first program for controlling the fuel cell system 1 of the present invention, hydrogen purging is performed during cathode scavenging which precedes anode scavenging, and at the same time, the dilution assist valve 52 is activated to assist the dilution. As a result, the hydrogen concentration in the anode channel 11 can be reduced in advance, and during the anode scavenging which follows the cathode scavenging, the concentration of hydrogen exhausted from the diluter 32 can be reduced to less than the second specific concentration. In this case, by performing a dilution assist, a time period for dilution by hydrogen purging can be shortened, which in turn shortens a time period for cathode scavenging.

Further, if hydrogen purging is performed during anode scavenging, there may be a risk that the concentration of hydrogen exhausted from the diluter 32 exceeds the upper limit concentration (first specific concentration). On the other hand, according to the second program for controlling the fuel cell system 1 of the present invention, a dilution assist is performed simultaneously with the purging during anode scavenging. As a result, a peak concentration generated at the initiation of the anode scavenging can be suppressed, and the concentration of hydrogen exhausted from the diluter 32 can be reduced to less than the second specific concentration.

Further, according to the first and second programs for controlling the fuel cell system 1 of the present invention, even when air supplied from the compressor 31 during anode scavenging is utilized, gas for dilution can be secured by the dilution assist valve 52, and thus hydrogen can be steadily diluted for exhaustion to outside.

Further, according to the third program for controlling the fuel cell system 1 of the present invention, even in the case where the purge valve 25 is activated to perform purging during cathode scavenging, when the hydrogen concentration in the diluter 32 is less than the third specific concentration, which is low, the dilution assist valve 52 is activated to blow off the low-concentration hydrogen in the diluter 32 to thereby suitably push out hydrogen out of the diluter 32. As a result, in the third program for controlling the fuel cell system 1 according to the present invention, by pushing the low-concentration hydrogen out of the diluter 32 by the dilution assist gas, hydrogen purging during scavenging is smoothly performed to thereby shorten a time period for scavenging.

Further, according to the fourth program for controlling the fuel cell system 1 of the present invention, when the hydrogen concentration in the diluter 32 is estimated to be less than the third specific concentration, which is low, the dilution assist valve 52 is activated to blow off the low-concentration hydrogen in the diluter 32 to thereby suitably push out the possible residual water (moisture) out of the diluter 32. As a result, in the fourth program for controlling the fuel cell system 1 according to the present invention, by pushing the low-concentration hydrogen out of the diluter 32 by the dilution assist gas, hydrogen purging during scavenging is smoothly performed to thereby shorten a time period for scavenging, and at the same time, water is suitably blown off, enhancing water-discharge efficiency.

What is claimed is:

1. A method for operating a fuel cell system comprising: a fuel cell comprising a fuel gas channel on an anode side and an oxidant gas channel on a cathode side, which is configured to generate electricity using a fuel gas and an oxidant gas; a diluting unit configured to dilute gas discharged from the fuel gas channel by mixing the discharged gas with a dilution gas, and to exhaust the diluted gas to outside; and a purge valve configured to purge gas in the fuel gas channel to the diluting unit;

in which method cathode scavenging is performed first and anode scavenging is performed subsequently, comprising:

a step of determining, during the cathode scavenging, whether or not a concentration of hydrogen exhausted from the diluting unit is less than a first specific concentration which is an upper limit value, and when it is determined that the hydrogen concentration is less than the first specific concentration, maintaining the purge valve in an opened state to perform purging; and a step of determining whether or not a concentration of hydrogen exhausted from the diluting unit is a second specific concentration or more which requires a dilution assist, and when it is determined that the hydrogen concentration is the second specific concentration or more, supplying a dilution assist gas to the diluting unit to assist dilution.

2. A method for operating a fuel cell system comprising: a fuel cell comprising a fuel gas channel on an anode side and an oxidant gas channel on a cathode side, which is configured to generate electricity using a fuel gas and an oxidant gas; a diluting unit configured to dilute gas discharged from the fuel gas channel by mixing the discharged gas with a dilution gas, and to exhaust the diluted gas to outside; and a purge valve configured to purge gas in the fuel gas channel to the diluting unit;

in which method cathode scavenging is performed first and anode scavenging is performed subsequently, comprising:

a step of determining, during the anode scavenging, whether or not a concentration of hydrogen exhausted from the diluting unit is less than a first specific concentration which is an upper limit value, and when it is determined that the hydrogen concentration is less than the first specific concentration, maintaining the purge valve in an opened state to perform purging; and a step of determining whether or not a concentration of hydrogen exhausted from the diluting unit is a second specific concentration or more which requires a dilution assist, and when it is determined that the hydrogen concentration is the second specific concentration or more, supplying a dilution assist gas to the diluting unit to assist dilution.

3. A method for operating a fuel cell system comprising: a fuel cell comprising a fuel gas channel on an anode side and an oxidant gas channel on a cathode side, which is configured to generate electricity using a fuel gas and an oxidant gas; a diluting unit configured to dilute gas discharged from the fuel gas channel by mixing the discharged gas with a dilution gas, and to exhaust the diluted gas to outside; and a purge valve configured to purge gas in the fuel gas channel to the diluting unit;

in which method cathode scavenging is performed first and anode scavenging is performed subsequently, comprising:

a step of determining, during the cathode scavenging, whether or not a concentration of hydrogen exhausted from the diluting unit is less than a first specific concentration which is an upper limit value, and when it is determined that the hydrogen concentration is less than the first specific concentration, maintaining the purge valve in an opened state to perform purging; and a step of determining whether or not a concentration of hydrogen exhausted from the diluting unit is less than a third specific concentration which is low and requires a dilution assist for pushing out gas, and when it is determined that the hydrogen concentration is less than the third specific concentration, performing the dilution assist by supplying a dilution assist gas to the diluting unit.

4. The method according to claim 1, wherein the dilution assist gas is supplied to the diluting unit only when it is determined that the hydrogen concentration is the second specific concentration or more and it is estimated that the hydrogen concentration becomes the first specific concentration or more.

* * * * *